No. 798,711. PATENTED SEPT. 5, 1905.
J. S. STEVENSON.
DUMP CAR.
APPLICATION FILED MAR. 20, 1905.
6 SHEETS—SHEET 3.
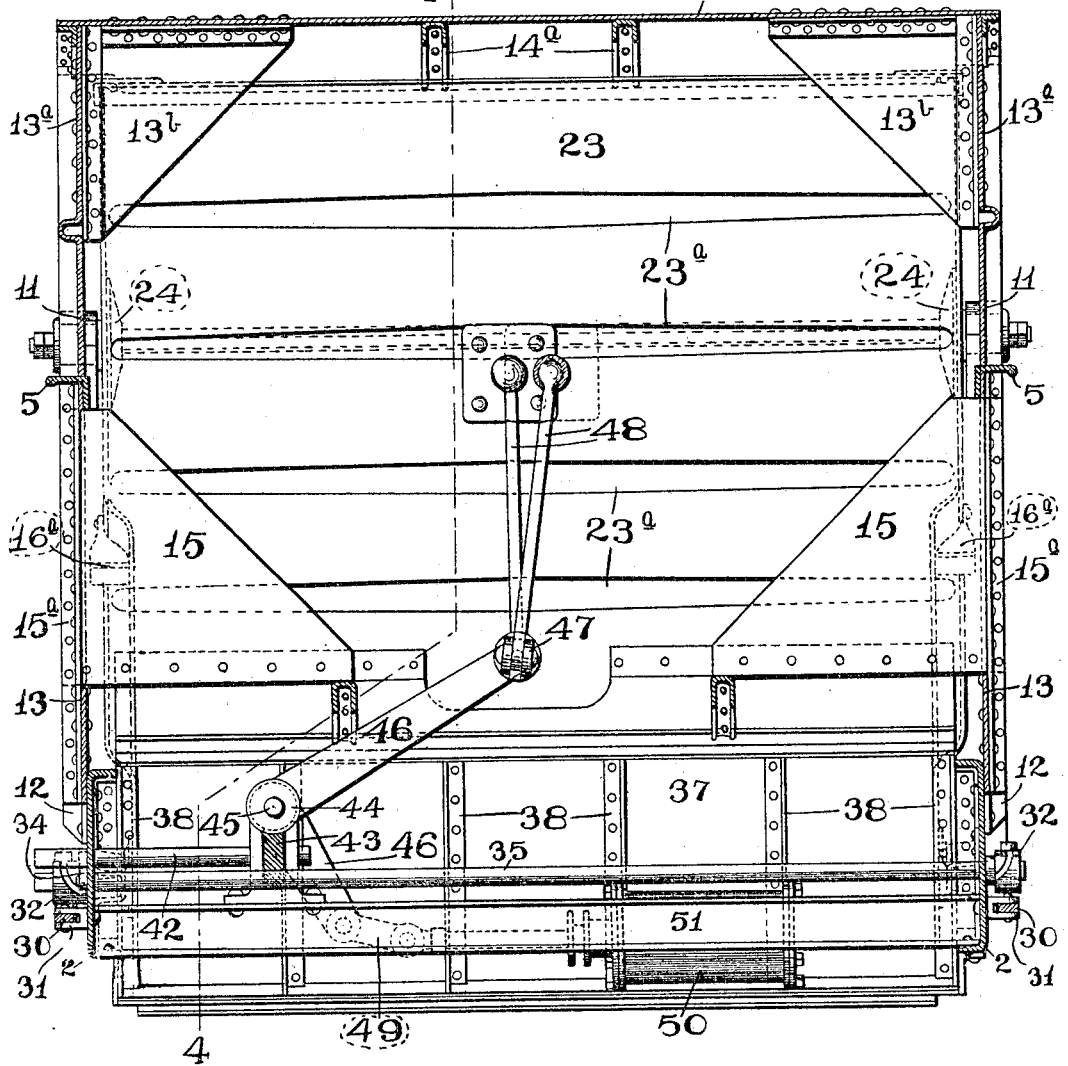
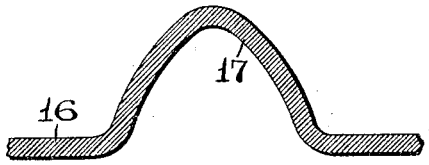
ATTEST.
H. G. Fletcher.
G. A. Pennington.
INVENTOR.
J. S. STEVENSON.
BY Bakewell & Cornwall
ATTY'S.

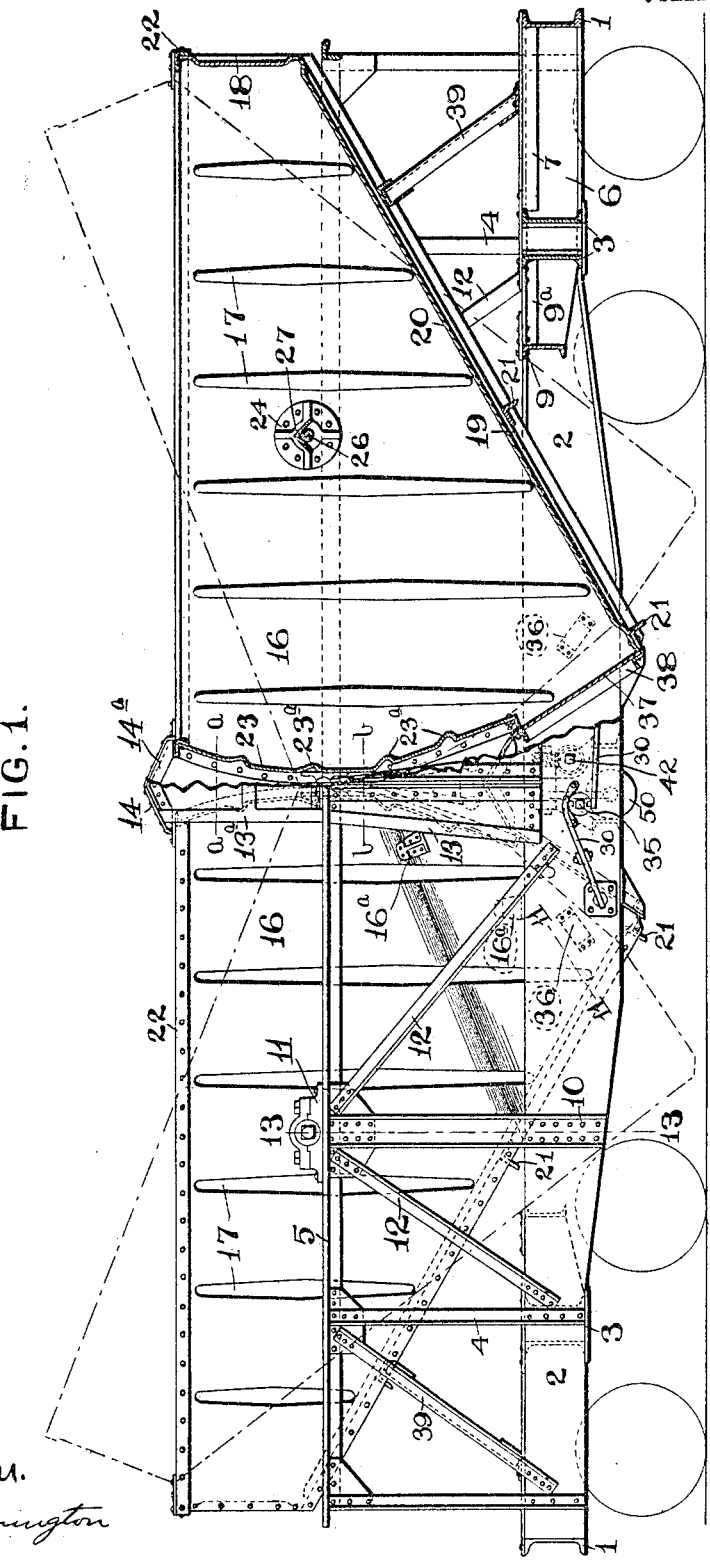

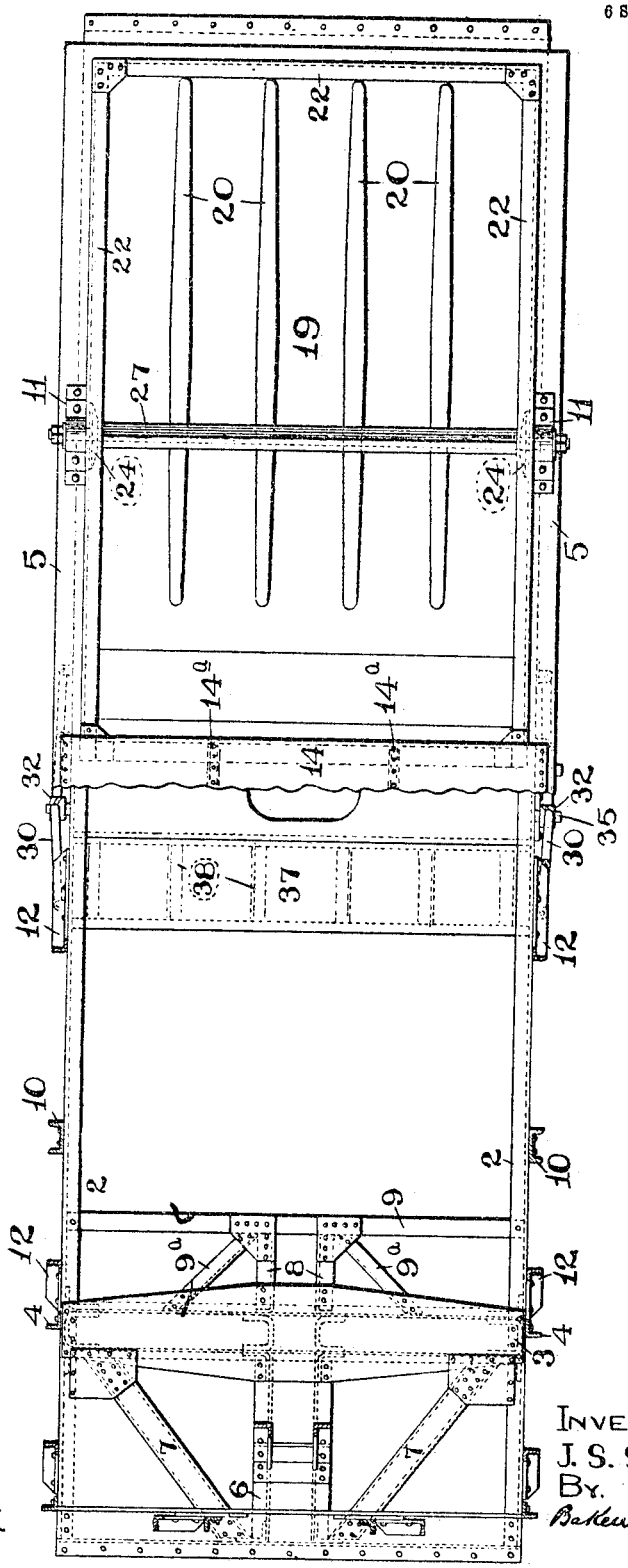

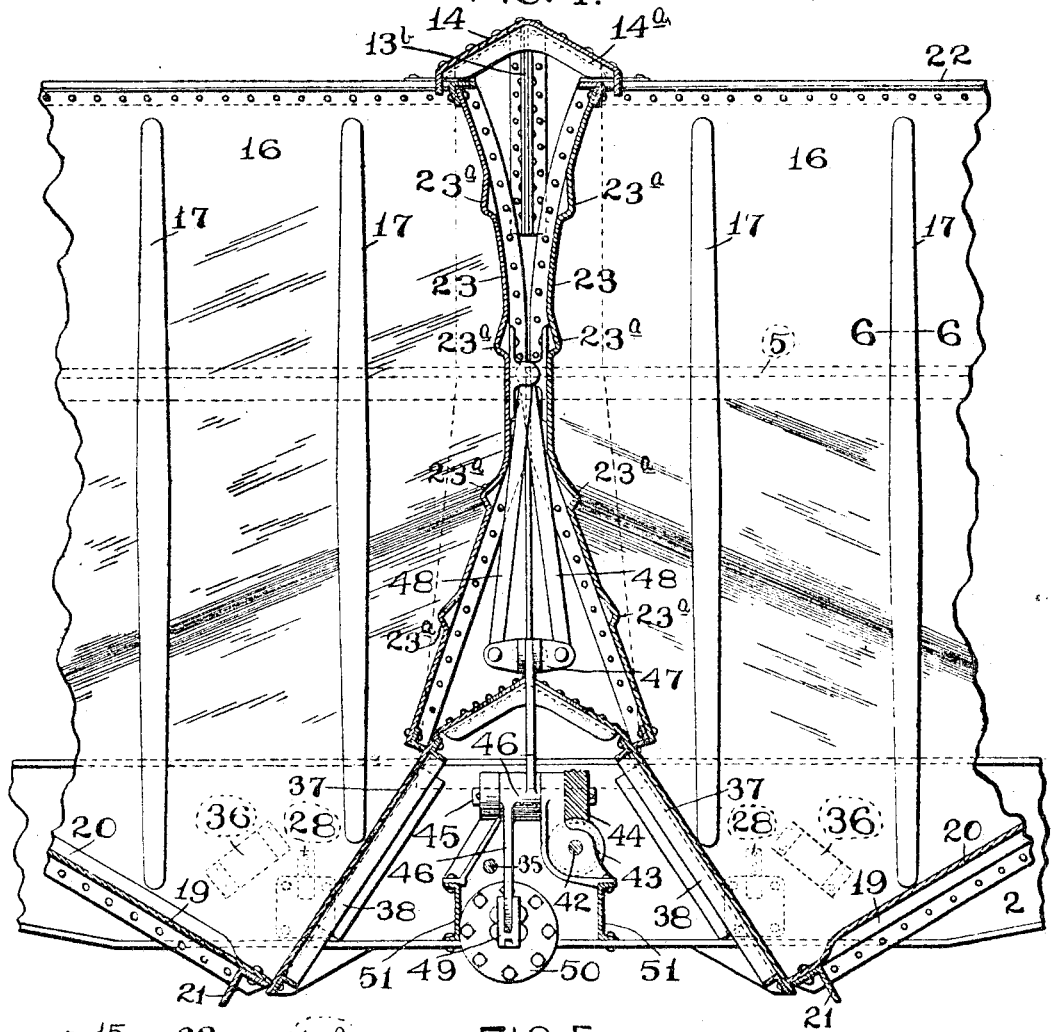
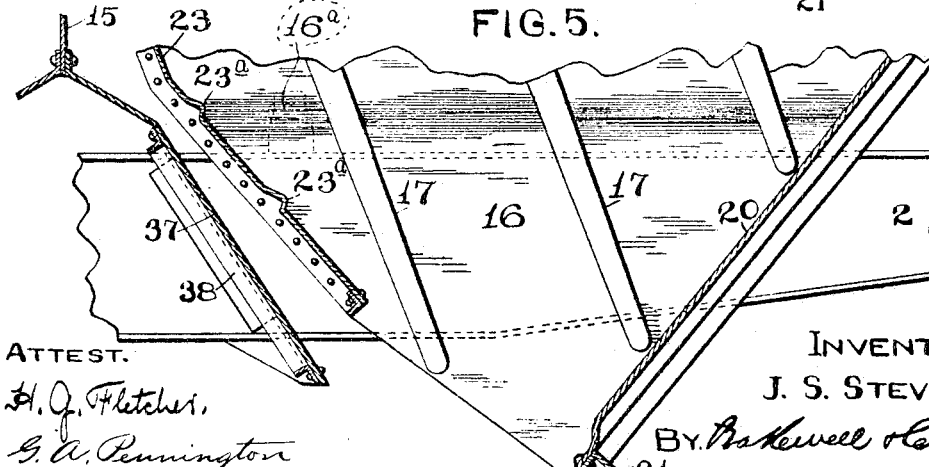

No. 798,711. PATENTED SEPT. 5, 1905.
J. S. STEVENSON.
DUMP CAR.
APPLICATION FILED MAR. 20, 1905.

6 SHEETS—SHEET 5.

ATTEST.
H. J. Fletcher.
G. A. Pennington.

INVENTOR.
J. S. STEVENSON.
By Bakewell Cornwall
ATTYS.

No. 798,711. PATENTED SEPT. 5, 1905.
J. S. STEVENSON.
DUMP CAR.
APPLICATION FILED MAR. 20, 1905.

6 SHEETS—SHEET 6.

Witnesses
a. J. McCauley.
G. A. Pennington.

Inventor:-
John S. Stevenson
BY Bakewell & Cornwall
ATT'Y'S.

UNITED STATES PATENT OFFICE.

JOHN S. STEVENSON, OF DETROIT, MICHIGAN.

DUMP-CAR.

No. 798,711. Specification of Letters Patent. Patented Sept. 5, 1905.

Application filed March 20, 1905. Serial No. 251,042.

*To all whom it may concern:*

Be it known that I, JOHN S. STEVENSON, a citizen of the United States, residing at Detroit, Wayne county, Michigan, have invented a certain new and useful Improvement in Dump-Cars, of which the following is a full, clear, and exact description, such as will enable others skilled in the art to which it appertains to make and use the same, reference being had to the accompanying drawings, forming part of this specification, in which—

Figure 7:
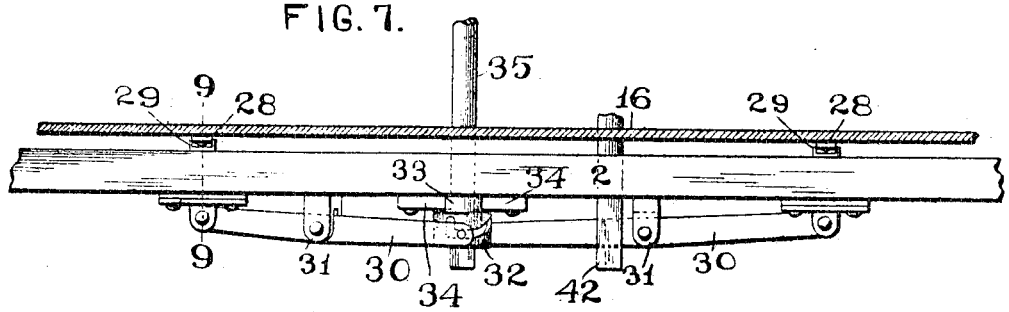
Figure 8:
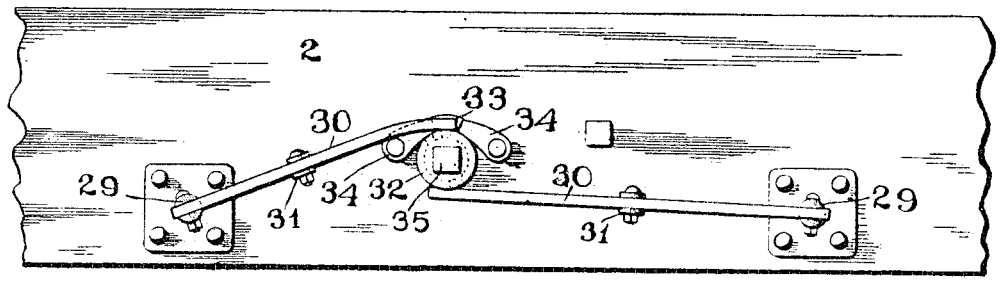
Figure 10:
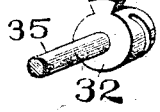
Figure 9:
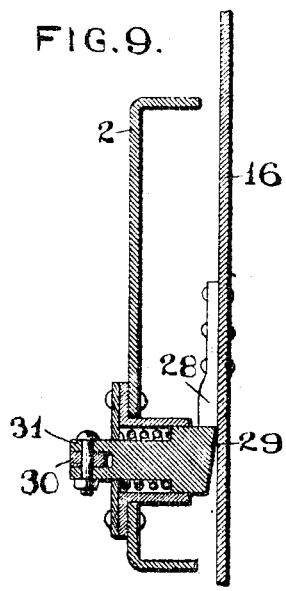
Figure 11:
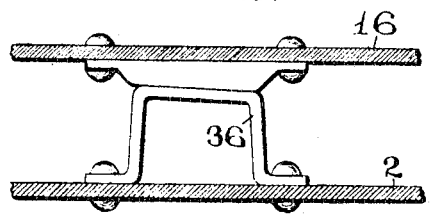
Figure 12:
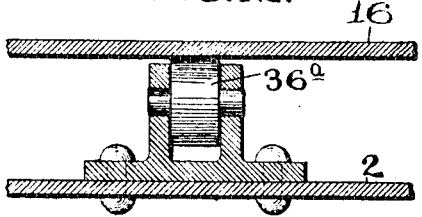
Figure 13:
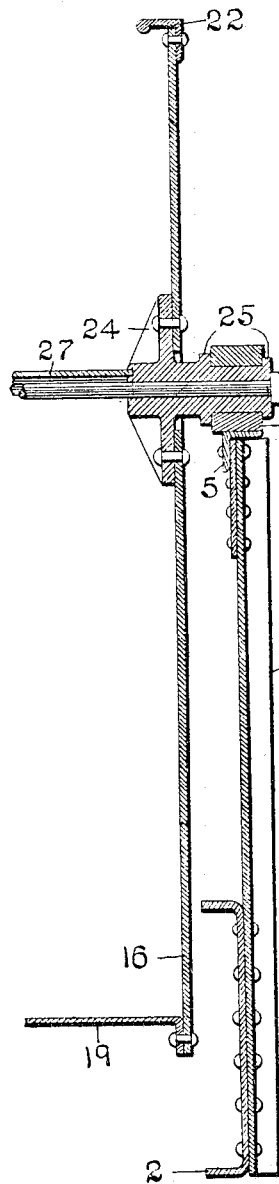
Figure 14:
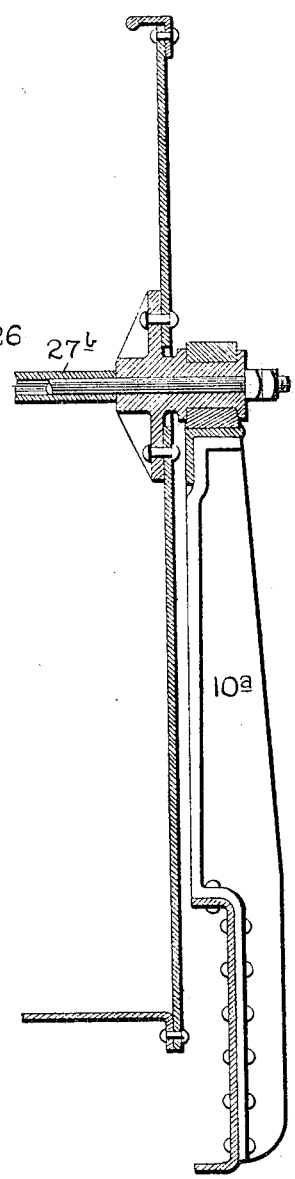
Figure 15:
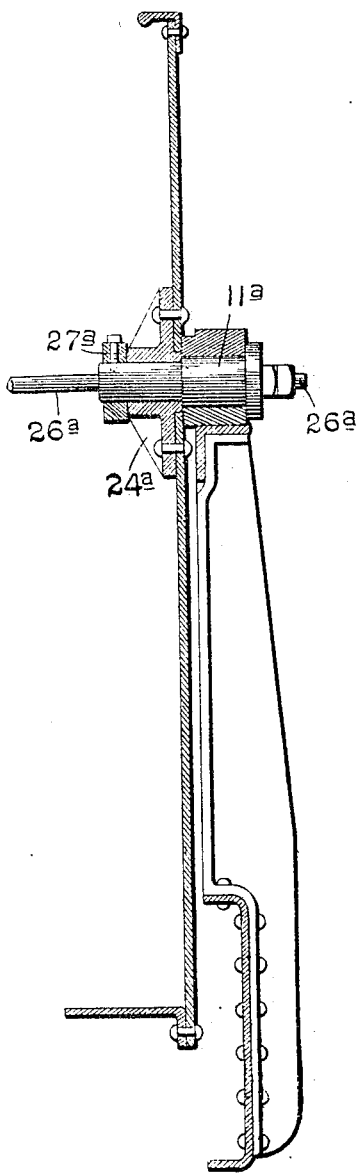

Figure 1 is a side elevational view, partly in section, of my improved dump-car. Fig. 1$^a$ is a sectional view on line $a$ $a$ of Fig. 1. Fig. 1$^b$ is a sectional view on line $b$ $b$ of Fig. 1. Fig. 2 is a top plan view, one of the tilting sections being removed to more clearly show the construction of the underframe. Fig. 3 is a vertical cross-sectional view through the center of the car. Fig. 4 is a longitudinal sectional view on the line 4 4 of Fig. 3. Fig. 5 is a detail view showing one of the tilting sections in a dumping position. Fig. 6 is a sectional view on the line 6 6 of Fig. 4. Fig. 7 is a top plan view of the latch-operating mechanism for the tilting sections. Fig. 8 is a side elevational view of said latch mechanism. Fig. 9 is an enlarged sectional view on the line 9 9 of Fig. 7. Fig. 10 is a detail view of the cam for operating the latch mechanism. Fig. 11 is a sectional view on the line 11 11 of Fig. 1. Fig. 12 is a detail view showing an antifriction-roller for cooperating with the tilting sections. Fig. 13 is a sectional view on line 13 13 of Fig. 1. Figs. 14 and 15 are modified forms.

This invention relates to a new and useful improvement in dump-cars of that class commonly known as "inwardly-tilting sections"—to wit, where the containing sections are so mounted that they discharge their load by being dumped toward each other.

The objects of my present invention are to improve generally upon this type of dump-car, particularly with respect to making the parts rigid and strong, so as to enable the car to stand up in the rough service to which it is subjected.

With these objects in view the invention consists in the construction, arrangement, and combination of the several parts, all as will be hereinafter described and afterward pointed out in the claims.

In the drawings I have illustrated an underframe comprising the usual end sills 1 and side sills 2, the latter being shown as pressed-steel side sills; but it is obvious that the side sills can be built up of plates and angles, as is well known in this art.

3 indicates the bolster, which is of well-known form.

The draft-sills 6 extend between the end sill and web of the bolster and in addition obliquely-arranged braces or diagonals 7 may be employed, as desired. Short sills 8 continue inwardly beyond the bolster to which they are secured, said sills being also connected to a cross member 9. Diagonal braces 9$^a$ may be used to stiffen the member 9.

The side frame of the car is a trussed structure, of which the angle 5 and the side sills 2 form constituent elements—to wit, the top and bottom chords, respectively—the angles 4 forming posts opposite the bolster-points, as will readily be seen. Posts 10 are secured to the side sills and through suitable connection-plates to the angle 5 at points intermediate the bolster and in vertical alinement with the bearings 11 for the trunnions or pivotal supports of the tilting sections. Diagonals 12 are also provided, the same diverging from the connection-plates at the upper ends of the posts 10, their lower ends being riveted to the side sills.

13 indicates a medial flanged plate which is riveted to the side sill and to the angle 5. A flanged plate 13$^a$ is secured to and extends above said angle and carries at its upper end a connecting tie member 14, which may be made of flanged metal. A corner-gusset 13$^b$ is employed to strengthen the member 14 at its ends, in addition to which braces 14$^a$ may be used at points between the ends. Riveted to plate 13 is an inwardly-extending gusset-plate 15, which is located in the space between the inwardly-tilting sections when the same are dumped, as shown by dotted lines in Fig. 1. Connecting-angles 15$^a$ are employed to secure the gusset-plate to the plate 13, as shown in Fig. 1$^b$. The dumping-sections are composed of side walls 16, which are preferably formed with inwardly-extending embossments 17 for the purpose of adding strength and rigidity to the structure. In addition to these embossments stiffening-angles may also be riveted to these side plates to resist bulging tendencies. Each tilting section is preferably provided with an outer end wall 18 and a floor 19, the latter being embossed and provided with raised ribs 20, which are preferably longitudinally disposed to add strength to the structure, in addition to which transversely-arranged angles 21 may be riveted under the floor for well-understood purposes. The floor-sheet is preferably flanged at its sides, or a connection-angle may be employed to rivet it to the side and end walls. A bulb-angle 22 is riveted around the upper edges of the side and end walls, said angle having its beaded leg extending inwardly. The inner end wall 23 connects the side walls and is embossed at $23^a$ to give it strength.

In the construction shown in Figs. 1 and 13 the side walls have riveted to them strikers or stops $16^a$, which coöperate with the side sills 2 when the sections are dumped. These side walls are also provided with suitable cast trunnions 24, provided with the usual attaching-flanges and strengthening-ribs for well-known purposes. These trunnions have collars 25 arranged on each side of the bearing 11, so as to prevent lateral displacement of the trunnion in its bearing. In addition to this the trunnions are made hollow for the passage of a tie-rod 26, said tie-rod being threaded at its end and provided with jam-nuts. Between the castings 24 is arranged an angle 27, under which the tie-rod is arranged, said angle having its ends seated in the castings 24 and acting as a distance-piece to prevent the tilting section from getting out of alinement at its bearing-points.

Instead of employing a rolled channel 10 as a supporting-post for the bearing 11, said channel being shown in Figs. 1 and 13, I may use a cast post $10^a$ (shown in Fig. 14) and a spacing-pipe $27^b$, surrounding the rod 26. Instead of mounting trunnions on the tilting section I may employ a journal-support for said sections, as illustrated in Fig. 15, in which the journal $11^a$ is mounted in the upper end of the post and the casting $24^a$ is riveted to the side wall of the tilting section and is loosely mounted on said journal. Instead of using an angle or spacing sleeve collars $27^a$ may be rigidly secured to the journal, which journal may be made hollow and a tie-bolt $26^a$ used in connection therewith, as heretofore described.

In order to prevent the tilting sections from accidentally dumping, I preferably rivet keeper-plates 28 to the side walls thereof, which keeper-plates (see Figs. 7 and 10) coöperate with spring-pressed latch-bolts 29, passing through the side sills and mounted in suitable bearings, as shown. The outer ends of these latch-bolts are pivotally connected to levers 30, fulcrumed in lugs 31, mounted on the side sills, the inner ends of said levers being provided with pins or rollers coöperating in the grooves of a cam 32. This cam is formed with a locking projection 33, with which coöperate locking-pawls 34. Cam 32 is mounted on a shaft 35, which preferably extends from side to side of the car, (the latch mechanism herein shown being duplicated on each side of the car, but the locking mechanism being preferably placed on one side of the car only,) one end of the shaft—the one on which the cam 32 is mounted—being provided with a non-circular portion for the reception of a socket-wrench, whereby the shaft may be rotated. Upon rotating the shaft all of the latches 29 are withdrawn and the tilting sections are permitted to descend. When the tilting sections return to normal position, their keeper-plates pass above the latches, the spring behind the latches forcing them under the keeper-plates, so as to hold the tilting sections home.

To avoid the chafing of the tilting sections against the side sill in moving to and from their dumping positions, I mount chafing-plates 36 on the side sill, as shown in Figs. 1 and 11, or an antifriction-roller $36^a$ may be mounted on the side sill, as shown in Fig. 12.

Referring now to Figs. 1 and 4, it will be seen that the upper inner edges of the side walls of each of the tilting sections are curved on an arc of a circle described from the pivotal point of said tilting sections. The lower inner edges are straight and coöperate with a cross-ridge comprising plates 37, which are riveted to the side sills and reinforced by stiffening-angles 38 and saddle-plates 37. This cross-ridge forms a very rigid connection between the side frames at the middle of the car and enables me to dispense with the use of center sills and support the tilting sections on the side frames thus rigidly connected. The flanged plate 14 also serves as an effectual tie, and the gusset-plates extending up on each side of the cross-ridge, to which they are connected, and to the trussed side frames effectually stiffen the structure. It is intended that there shall be sufficient clearance of the framing of the car to permit the tilting sections to move freely without friction, said tilting sections being held in their normal position principally by their supporting-trunnions, part of the weight being received by the extensions 39, extending up from the underframe, and by the latches.

In Figs. 3 and 4 I have shown a mechanism for positively moving the sections to and from their open positions. This is useful in connection with my improved construction, particularly in cold weather where water from rain or snow freezes, so as to prevent the free movement of the parts and the ready discharge of the load. This mechanism is capable of being operated by hand or compressed air. The construction comprises a shaft 42, having the usual squared stem for attachment of a socket-wrench. 43 indicates a worm-wheel on the inner end of this shaft, which coöperates with a worm-wheel 44, fixed to a shaft 45. On shaft 45 is a bell-crank lever 46, carrying a swivel connection 47, in which are mounted links 48, connected by ball-and-socket joints to the tilting sections, respectively. The other member of the bell-crank lever 46 is connected by a link 49 to a fluid-actuated piston arranged in a cylinder 50. When shaft 42 is rotated manually, the sections are raised or lowered and the piston is idly reciprocated, and when pressure is admitted behind the piston the sections are lowered, shaft 42 rotating idly, pressure in front of the pistons returning the sections home. Channels 51, carried by the side sills, support the moving parts of the section-operating mechanism, as well as the cylinder 50.

I am aware that minor changes in the construction, arrangement, and combination of the several parts of my device can be made and substituted for those herein shown and described without in the least departing from the nature and principle of my invention.

Having thus described the invention, what is claimed as new, and desired to be secured by Letters Patent, is—

1. In a dump-car, the combination with trussed side frames comprising top and bottom chords, posts and diagonals, of tilting sections pivotally mounted between said frames, means for tying the frames together at the pivotal points of said sections, and a transversely-arranged central cross-ridge connecting said frames; substantially as described.

2. In a dump-car, the combination with an underframe comprising end, side and draft sills and bolster extensions on the underframe providing supports for the tilting sections, trussed side frames of which said side sills form the bottom chords, top chords, posts and diagonals between said top and bottom chords, and tilting sections mounted on said trussed side frames; substantially as described.

3. In a dump-car, the combination with end, side and draft sills, of a bolster, short sills extending inwardly beyond the bolster, and transverse beams connecting the side sills and forming a stop for the tilting sections in their dumping position; substantially as described.

4. In a dump-car, the combination with a trussed side frame, of tilting sections pivotally mounted thereon, a flanged plate 13 riveted to the trussed side frame and forming a part thereof, and a gusset-plate connected to said plate; substantially as described.

5. In a dump-car, the combination with trussed side frames, of tilting sections pivotally mounted thereon, centrally-arranged flanged plates extending above the top chord of said trusses, and a tie member connecting the upper ends of said plates; substantially as described.

6. In a dump-car, the combination with a supporting-frame, of tilting sections pivotally mounted thereon, and antifriction-rollers mounted on said frame and coöperating with the vertical side walls of said tilting sections; substantially as described.

7. The herein-described tilting section for dump-cars, the same consisting of side, end and bottom sheets, a strengthening-angle arranged around the upper edges of the side and end sheets the inner end sheet being spaced from the bottom sheet to provide a discharge-opening, and transversely-disposed floor-strengthening angles; substantially as described.

8. The combination with a tilting section, of hollow bearings secured to its side walls, a tie-rod extending through said hollow bearings and nuts on the end of said tie-rod for preventing the bearings from spreading apart; substantially as described.

9. The combination with a tilting section, of castings secured to its side walls and forming bearings, tie-rods passing through said castings, and a spacing-sleeve surrounding the tie-rod and arranged between said castings; substantially as described.

10. The combination with a frame having bearings, of tilting sections, hollow trunnions on said sections and which are journaled in said bearings, means for preventing lateral movement of the trunnions with respect to said bearings, means for spacing said trunnions apart, and means for tying said trunnions together; substantially as described.

11. The combination with a supporting-frame, of tilting sections pivotally mounted thereon, said tilting sections having inner end walls which terminate short of the bottom wall so as to form discharge-openings and a centrally-arranged cross-ridge acting to close the discharge-openings in said tilting sections respectively; substantially as described.

12. The combination with a supporting-frame, of tilting sections pivotally mounted thereon, an inverted-V-shaped cross-ridge arranged between the lower inner edges of said tilting sections, and a latch-operating rod passing through said cross-ridge; substantially as described.

13. The combination with a supporting-frame, of a tilting section pivotally mounted thereon, a keeper on said tilting section, and a spring-pressed bolt mounted on the supporting-frame and coöperating with said keeper; substantially as described.

14. The combination with a supporting-frame, of a tilting section pivotally mounted thereon, a keeper on said tilting section, a spring-pressed bolt mounted on the supporting-frame, and means for operating said spring-pressed bolt; substantially as described.

15. The combination with a supporting-frame, of tilting sections pivotally mounted thereon, an inverted-V-shaped cross-ridge arranged between the lower inner edges of said tilting section, an operating-shaft mounted within said cross-ridge, a lever on said shaft, links connecting said lever and said tilting sections, and means for rotating said shaft; substantially as described.

16. The combination with a supporting-frame, of tilting sections pivotally mounted thereon, an inverted-V-shaped cross-ridge arranged between the lower inner edges of said tilting section, an operating-shaft mounted within said cross-ridge, a lever on said shaft, links connecting said lever and said tilting sections, and manually-operable means for rotating said shaft; substantially as described.

17. The combination with a supporting-frame, of tilting sections pivotally mounted thereon, an inverted-V-shaped cross-ridge arranged between the lower inner edges of said tilting section, an operating-shaft mounted within said cross-ridge, a lever on said shaft, links connecting said lever and said tilting sections and a fluid-actuated piston for rotating said shaft; substantially as described.

18. In a dump-car, the combination with a supporting-frame, of tilting sections pivotally mounted thereon, and guide means coöperating with the vertical walls of the tilting sections and frame; substantially as described.

19. In a dump-car, the combination with a supporting-frame, of tilting sections pivotally mounted thereon, and antifriction guide-rollers mounted on said frame and coöperating with the vertical side walls of said tilting sections; substantially as described.

20. In a dump-car, the combination with trussed side frames, of tilting sections having pivotal points in the plane of the top chords of the trussed side frames, and a centrally-arranged cross-ridge carried by the bottom chords of said trussed side frames and acting to close the discharge-openings in said tilting sections respectively; substantially as described.

21. In a dump-car, the combination with trussed side frames comprising top and bottom chords, vertical posts and diagonals, of tilting sections, bearings for said tilting sections in vertical alinement with vertical posts of the trussed side frames and located above the top chords thereof, said tilting sections having inner end walls which terminate above the bottom walls to form discharge-openings, and a V-shaped cross-ridge carried by the trussed side frames and serving as a closure for said discharge-openings when the tilting sections are in normal position; substantially as described.

22. In a dump-car, the combination with trussed sides frames, of tilting sections pivotally supported thereby and having discharge-openings at their inner ends, a cross-ridge for closing said discharge-openings when said tilting sections are in normal position, and gusset-plates riveted to said trussed side frames and to the upper portion of said cross-ridge; substantially as described.

23. In a dump-car, the combination with trussed side frames having centrally-arranged upward extensions located above the top chords of said trussed side frames, means for tying the upper extremities of said extensions together, and gusset-plates riveted to said extensions and to said tying means; substantially as described.

24. In a dump-car, the combination with trussed side frames, of tilting sections pivotally mounted therein, centrally located upward extensions, tying means connecting the upper extremities of said extensions, said tying means coöperating with the inner ends of said tilting sections when in their home position; substantially as described.

25. In a dump-car, the combination with trussed side frames, tilting sections pivotally mounted thereon and whose upper edges when in normal position are located above the trussed side frames, and a hood or cover mounted upon said trussed side frames and extending over the contiguous inner edges of said tilting sections; substantially as described.

26. In a dump-car, the combination with supporting side frames, tilting sections mounted therein and having discharge-openings at their inner ends, a centrally-arranged cross-ridge acting as a closure for said discharge-openings when the tilting sections are in normal position, mechanism for operating said tilting sections, said mechanism being located between said tilting sections and partly within said cross-ridge, and a hood or cover supported by the side frames and extending over the contiguous inner ends of the tilting sections in their home position; substantially as described.

27. In a dump-car, the combination with a supporting-frame, tilting sections mounted in said frame, and means located between said tilting sections for operating the same simultaneously, said means comprising a rock-arm, means for rocking said arm, an equalizing-lever carried by the end of said rock-arm, and link connections between the ends of said equalizing-lever and the ends of said tilting sections; substantially as described.

28. In a dump-car, the combination with a supporting-frame, tilting sections pivotally mounted therein, means located between said tilting sections for operating them simultaneously, said means comprising a rock-arm 46, a connection between the end of said rock-arm and both of said tilting sections, and manually-operable means for actuating said rock-arm; substantially as described.

29. In a dump-car, the combination with a supporting-frame, tilting sections pivotally mounted therein, means located between said tilting sections for operating them simultaneously, said means comprising a rock-arm 46, a connection between the end of said rock-arm and both of said tilting sections, and fluid-pressure means for operating said rock-arm; substantially as described.

30. In a dump-car, the combination with a supporting-frame, tilting sections pivotally mounted therein, means located between said tilting sections for operating them simultaneously, said means comprising a rock-arm 46, a connection between the end of said rock-arm and both of said tilting sections, a manually-operable means for operating said rock-arm, and fluid-pressure means also connected to said rock-arm for operating the same; substantially as described.

31. In a dump-car, the combination with supporting-frames, tilting sections pivotally mounted therein, said tilting sections having discharge-openings at their inner ends, a cross-ridge closing said discharge-openings when the tilting sections are in normal position, beams arranged within said cross-ridge and connected to said supporting-frame, and operating means mounted upon said beams for moving the tilting sections to and from dumping position; substantially as described.

32. In a dump-car, the combination with a supporting-frame including side sills, of tilting sections pivotally mounted upon said supporting-frame, said tilting sections having discharge-openings at their inner ends, means carried by said side sills and extending transversely the car for closing said discharge-openings when the tilting sections are in normal position; substantially as described.

In testimony whereof I hereunto affix my signature, in the presence of two witnesses, this 2d day of March, 1905.

JOHN S. STEVENSON.

Witnesses:
    GEO. F. PULFORD,
    A. D. MCADAM.